United States Patent [19]
Momberg

[11] 3,939,471
[45] Feb. 17, 1976

[54] LIQUID LEVEL TAMPER ALARM

[76] Inventor: Vernon B. Momberg, 113 Third St., Hood River, Oreg. 97031

[22] Filed: Apr. 26, 1974

[21] Appl. No.: 464,499

[52] U.S. Cl. .................... 340/59; 73/308; 73/313; 340/177 VA; 340/181; 340/244 R
[51] Int. Cl.² ............................................ B60Q 1/00
[58] Field of Search ............ 340/244 R, 244 C, 285, 340/65, 59, 181, 326, 253 H, 421, 177 R, 177 CA, 244 A, 244 B, 248 A, 52 R; 73/308, 313

[56] References Cited
UNITED STATES PATENTS

| | | | |
|---|---|---|---|
| 2,630,007 | 3/1953 | Howe et al. | 73/88.5 |
| 2,756,410 | 7/1956 | Tobias | 340/181 |
| 3,054,994 | 9/1962 | Haram | 340/326 |
| 3,082,412 | 3/1963 | Sargent | 340/181 |
| 3,335,414 | 8/1967 | Meserow | 340/181 |
| 3,668,681 | 6/1972 | Kaplan | 340/280 |
| 3,772,641 | 11/1973 | Grosser et al. | 340/33 |

Primary Examiner—John W. Caldwell
Assistant Examiner—James J. Groody
Attorney, Agent, or Firm—Lee R. Schermerhorn

[57] ABSTRACT

A liquid level transducer actuates a relay to sound an alarm when there is a change in a liquid level in a tank. A bridge circuit is balanced at an existing liquid level to maintain the relay normally deenergized. A change in the liquid level unbalances the bridge circuit causing the relay to be energized. The system may be applied to stationary storage tanks or to vehicle fuel tanks to warn of theft of fuel. In a vehicle application an unauthorized movement of the vehicle would also cause sufficient shifting of the fuel in the tank to sound the horn and give warning.

5 Claims, 1 Drawing Figure

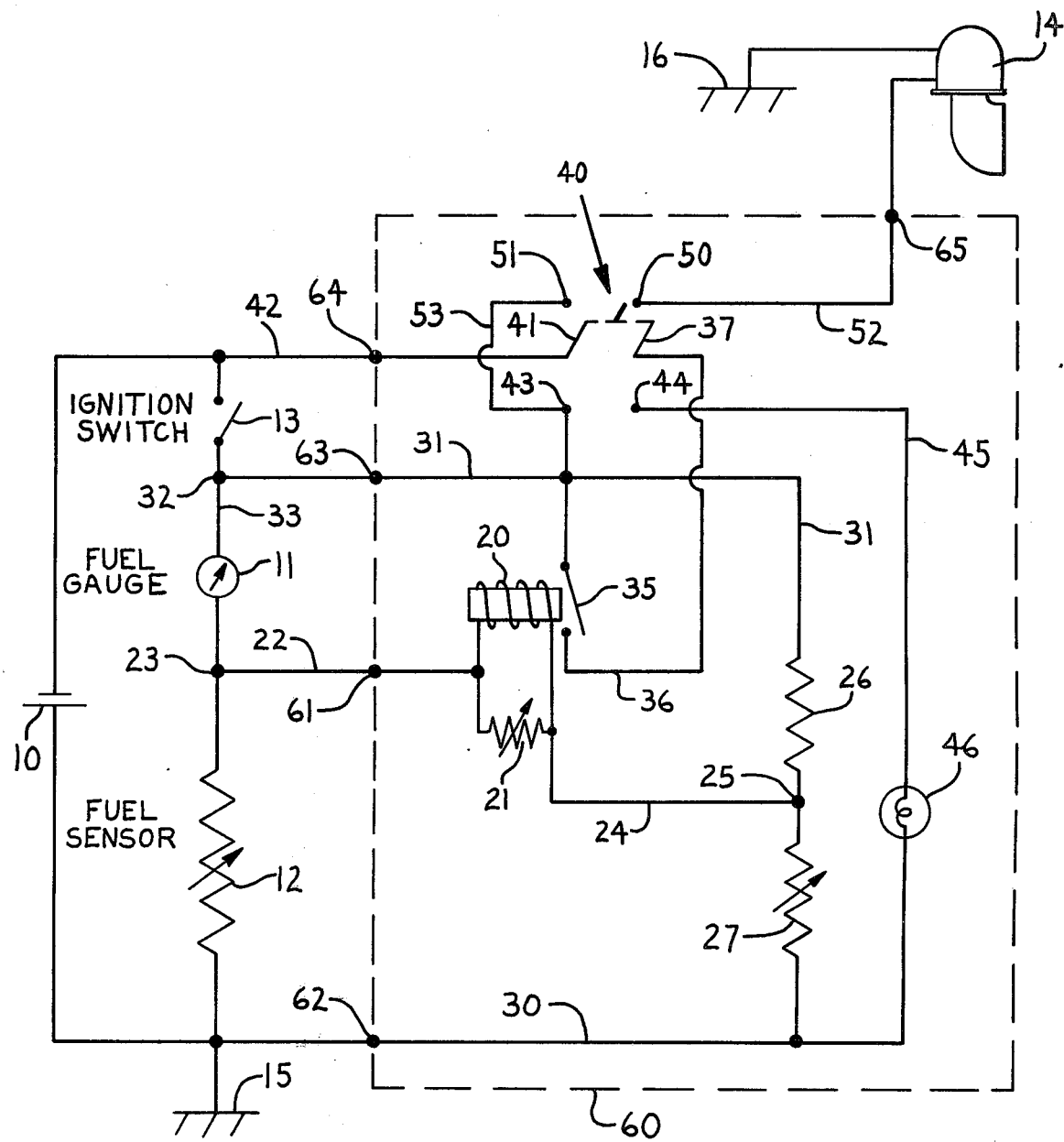

LIQUID LEVEL TAMPER ALARM

BACKGROUND OF THE INVENTION

This invention relates to a liquid level tamper alarm and is of particular advantage in discouraging the theft of fuel from storage tanks or automobile fuel tanks.

Heretofore, attempts to prevent or discourage the theft of fuel have generally been directed to the provision of locking caps for the tanks or obstructing devices to prevent access to the fuel through the filler opening. Such devices are often ineffective because they are obvious and can usually be removed or circumvented in one way or another. For many purposes, a concealed alarm mechanism is more effective because of the element of surprise to the thief and because it cannot be anticipated and overcome before its function has been accomplished if its existence is unknown to the thief.

Objects of the invention are, therefore, to provide a liquid level tamper alarm, to provide an operating mechanism for such an alarm which is entirely concealed, to provide an alarm which will respond either to the lowering or the raising of a liquid level in a tank, to provide an alarm of the type described which is especially suitable for either stationary fuel storage tanks or fuel tanks on vehicles, to provide an alarm system of the type described which is adapted to utilize the conventional fuel transducer in an automobile fuel tank without the use of any attachments to the tank itself, and to provide an alarm which will warn of theft of an automobile as well as the theft of its fuel.

SUMMARY OF THE INVENTION

In the present system a liquid level transducer actuates a relay to sound an alarm when there is a change in a liquid level in a tank. A bridge circuit is balanced at an existing liquid level to maintain the relay normally deenergized. Either raising or lowering the liquid level unbalances the bridge circuit, causing the relay to be energized.

The system may be applied to stationary storage tanks or to vehicle fuel tanks to warn of theft of fuel. The system is readily applicable to an automobile electrical system utilizing the conventional fuel gauge transducer to sound the horn in case of tampering. In an automobile application, the fuel transducer also responds to shifting of the fuel in the tank to warn of unauthorized movement of the vehicle after it has been parked. Thus, the device also functions as a vehicle theft alarm.

The invention will be better understood and the foregoing and other objects and advantages will become apparent from the following description of the preferred embodiment illustrated on the accompanying drawing. Various changes may be made, however, in the details of the system and certain features may be used without others. All such modifications within the scope of the appended claims are included in the invention.

BRIEF DESCRIPTION OF THE DRAWING

The single FIGURE of drawing is a wiring diagram illustrating the application of the invention to an automobile.

DESCRIPTION OF THE PREFERRED EMBODIMENT

In the automobile application shown in the drawing, the battery 10 operates the fuel gauge 11 through a fuel sensor or transducer 12 when the accessory section of ignition switch 13 is closed. Numeral 14 designates the usual traffic warning horn 14. The battery and fuel gauge circuit are grounded to the frame of the vehicle at 15 and the horn is similarly grounded at 16. These instruments are all a part of conventional automobile equipment to which the present invention is adapted.

A relay 20, preferably including a sensitivity control rheostat 21, is energized through a wire 22 connected at point 23 in the fuel gauge circuit between fuel gauge 11 and transducer 12. The relay energizing circuit further includes a wire 24 connected at point 25 in a branch circuit, between a fixed resistance 26 and a variable resistance 27. The other side of variable resistance 27 is connected to a ground wire 30 and the other side of fixed resistance 26 is connected to branch circuit wire 31, the latter being connected at 32 to a wire 33 which connects fuel gauge 11 with ignition switch 13.

It will be apparent that the circuit elements just described form a bridge circuit which is effective to energize relay 20 when the circuit is unbalanced and which will deenergize the relay when the circuit is balanced. In order to obtain the desired balance, the value of resistance 26 is made equal to the fixed resistance of fuel gauge 11 and the range of variable resistance 27 is made comparable to the range of the variable resistance of transducer 12. When variable resistance 27 is adjusted to the same value as transducer resistance 12 at any existing fuel level, equal voltages exist at points 23 and 25 and the relay 20 is deenergized. When transducer resistance 12 is either increased or decreased, the bridge circuit will be unbalanced producing different voltages at points 23 and 25 which will energize the relay 20.

Energization of relay 20 closes relay switch 35 to energize wire 36 through wire 31 and connection 32 when ignition switch 13 is closed. Wire 36 is connected to switch arm 37 in a double pole, double throw switch 40. The other switch arm 41 is connected to battery wire 42. When switch 40 is closed on its lower contacts 43 and 44, the switch arm 41 shunts ignition switch 13 to energize wire 31 directly from battery wire 42.

When switch 40 is closed in its lower position with switch arm 37 engaging contact 44, the energization of wire 36 completes a circuit through wire 45 to indicator lamp 46 and ground wire 30 whereby this lamp signals the closing of relay switch 35 in response to unbalance of the bridge circuit.

When switch 40 is closed in its upper position, its arm 37 engages a contact 50 and its arm 41 engages a contact 51. Contact 50 is connected to horn wire 52 and contact 51 is connected through a wire 53 with contact 43. This upper position of switch 40 may be referred to as the alarm position and the lower position described above may be referred to as the indicator position. When switch 40 is open, the circuits are broken to both horn 14 and signal light 46.

The components of the system are preferably contained in a case 60 having external connections with the automobile electrical system for convenient installation as an accessory device. Thus, the case 60 is equipped with external connections 61, 62, 63, 64 and 65 for the wires 22, 30, 31, 42 and 52, respectively.

In order to set the alarm after the automobile is parked, the switch 40 is first closed in its lower or signal position with ignition switch 13 either closed or open. If signal light 46 is glowing, variable resistance 27 is adjusted until the light is extinguished. The open circuit at contact 50 prevents sounding of the horn while resistance 27 is being adjusted. The extinguising of light 46 indicates that the bridge circuit is balanced with relay 20 deenergized and relay switch 35 in open position. Then switch 40 is shifted to its upper or alarm position.

If fuel should be removed or if liquid should be added to the fuel tank, the resistance of transducer 12 will be changed, unbalancing the bridge circuit and creating a difference in potential between points 23 and 25. Such difference in potential, depending on the setting of sensitivity control 21, will energize relay 20 to close relay switch 35 to complete a circuit to horn 14 through battery wire 42, switch arm 41, contact 51, wire 53, relay switch 35, wire 36, switch arm 37, contact 50 and wire 52, causing sounding of the horn 14. Also, if the automobile is stolen the movement of the vehicle will shift the fuel back and forth in the tank producing the same effect on transducer 12 as though liquid were being removed from the tank or added thereto, causing intermittent sounding of the horn.

The details of the system may be modified within the spirit of the invention and solid state diodes and transistors may be used to produce the described functions, if desired. The signal lamp 46 may be a light emitting diode.

Also, with slight modification, the present system is adapted to warn of theft from stationary storage tanks. Very little modification would be necessary if the stationary tank were equipped with a liquid level transducer similar to transducer 12 and an electric gauge corresponding to fuel gauge 11. For tanks not so equipped, the system may include a transducer 12 which is insertable in the tank and either a gauge 11 or an equivalent fixed resistance to complete the bridge circuit as will be readily understood by persons skilled in the art.

In either stationary or vehicle tanks the existence of the present system is not apparent to a thief until his tampering has put the alarm into operation. In an automobile installation there is no attachment or connection to the fuel tank which might be observed by the thief. Thus, the thief does not have an opportunity to circumvent or disable the warning system preliminary to the theft of the fuel or other liquid or before proceeding to steal a vehicle equipped with the present system. Locking tank caps and other devices preventing access to the interior of a tank lack the element of surprise to the thief and may often be removed without too much difficulty or merely quietly circumvented as by punching a hole in the tank.

Having now described my invention and in what manner the same may be used, what I claim as new and desire to protect by Letters Patent is:

1. In a vehicle having a liquid fuel tank containing a variable resistance depth gauge transducer, an electric fuel gauge, an ignition switch, an electric traffic warning horn, and a battery, said transducer, fuel gauge and ignition switch being connected in series circuit across said battery; the improvement comprising a fixed resistance and an adjustable resistance connected in series between a terminal of said transducer which is connected to one terminal of said battery and a terminal of said fuel gauge which is connected to said ignition switch, a relay having one terminal connected between said fixed and adjustable resistances and another terminal connected between said transducer and fuel gauge to form a bridge circuit which may be balanced by said adjustable resistance at any existing quiescent fuel level to maintain said relay normally deenergized and wherein any upward or downward movement of the fuel level will change the resistance of said transducer to unbalance said bridge circuit and energize said relay, and circuit means operable by energization of said relay to sound said horn, a signal lamp arranged to indicate a balanced or unbalanced condition of said bridge circuit; said circuit means comprising a relay switch which is closed by energization of said relay, and a three position manual switch, said manual switch having an open position disconnecting both said horn and said signal lamp to prevent the energization thereof, said manual switch having a first closed position connecting said signal lamp in series with said relay switch to energize said lamp when said relay switch is closed, and said manual switch having a second closed position connecting said horn in series with said relay switch to energize said horn when said relay switch is closed.

2. In a vehicle having a liquid fuel tank containing a variable resistance depth gauge transducer, an electric fuel gauge, an ignition switch, an electric traffic warning horn, and a battery, said transducer, fuel gauge and ignition switch being connected in series circuit across said battery; the improvement comprising a fixed resistance and an adjustable resistance connected in series between a terminal of said transducer which is connected to one terminal of said battery and a terminal of said fuel gauge which is connected to said ignition switch, a relay having one terminal connected between said fixed and adjustable resistances and another terminal connected between said transducer and fuel gauge to form a bridge circuit which may be balanced by said adjustable resistance at any existing quiescent fuel level to maintain said relay normally deenergized, any increase or decrease in the resistance of said transducer resulting from upward or downward movement of the fuel level unbalancing said bridge circuit and energizing said relay, and circuit means operable by energization of said relay to sound said horn.

3. The invention of claim 2 including a sensitivity control for said relay.

4. The invention of claim 3, said sensitivity control comprising an adjustable resistance.

5. The invention of claim 2 including a signal lamp arranged to indicate a balanced or unbalanced condition of said bridge circuit.

* * * * *